(No Model.)

O. H. BEAM.
NUT LOCK.

No. 504,296. Patented Aug. 29, 1893.

Witnesses:
M. E. Harrison
J. A. Herron

Inventor.
Oren H Beam
O. D. Levis
Att'y.

United States Patent Office.

OREN H. BEAM, OF ALLEGHENY, PENNSYLVANIA, ASSIGNOR OF ONE-HALF TO CHARLES F. KNAPP, OF SAME PLACE.

NUT-LOCK.

SPECIFICATION forming part of Letters Patent No. 504,296, dated August 29, 1893.

Application filed November 11, 1892. Serial No. 451,709. (No model.)

*To all whom it may concern:*

Be it known that I, OREN H. BEAM, a citizen of the United States, residing at Allegheny, in the county of Allegheny and State of Pennsylvania, have invented certain new and useful Improvements in Nut-Locks; and I do hereby declare the following to be a full, clear, and exact description of the invention, such as will enable others skilled in the art to which it pertains to make and use the same, reference being had to the accompanying drawings, which form a part of this specification.

My invention relates to an improved nut lock, and consists in certain details of construction, and combination of parts as will be fully described hereinafter.

Figure 1:
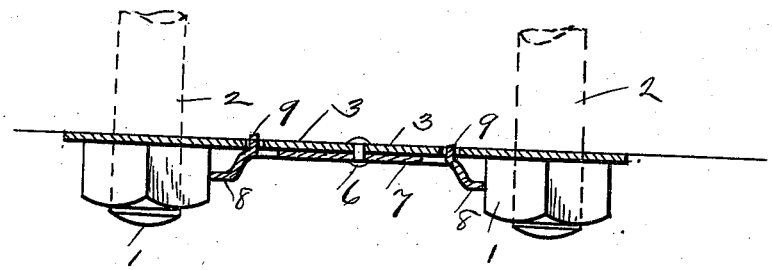
Figure 4:
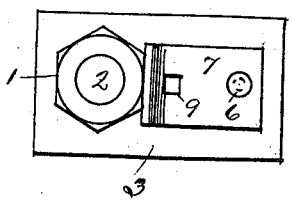
Figure 2:
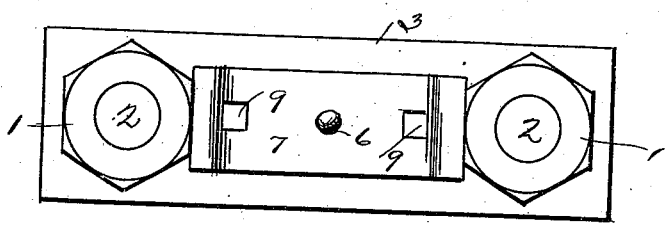
Figure 3:
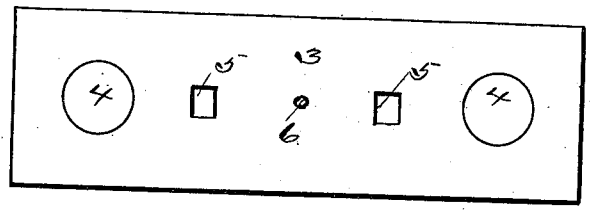

In the accompanying drawings, Figure 1 is a sectional plan view of my improved nut locking device which is constructed in accordance with my invention. Fig. 2 is a side elevation of the same. Fig. 3 is a face view of the washer plate used in connection with my improved nut lock. Fig. 4 is a face view of a lock for a single nut.

To put my invention into practice I provide a rectangular plate 3, and form circular openings 4 therein for the reception of the bolts 2. This plate 3 is provided with two other openings 5, located between the bolt openings 4, and a small opening at the center in which a rivet 6 is placed for the purpose of attaching a locking plate 7 thereto. This locking plate 7 consists of a rectangular strip of metal having two integral projecting portions 9 extending from the rear surface, and adapted to enter the openings 5, formed in the plate 3, for the purpose of preventing the said plate 7 from turning about the rivet 6. This locking plate is bent outwardly at each end, and is in close contact with the sides of two nuts 1. This nut lock is adapted for use on railway fish bars. The plate 3, is first placed in position and then the nuts 1 are screwed tightly in position. The locking plate 7 is now secured in position by means of the rivet 6, which had been placed in its opening before the plate 3 had been secured.

Having thus described my invention, what I claim, and desire to secure by Letters Patent, is—

In a nut-lock, the combination, with the bolts and their nuts,—of a fish-plate having suitable bolt-holes, and provided with a central aperture to receive a bolt or rivet, and with two clip-receiving openings, one on either side of the central aperture,—and a locking plate made in a single piece of spring-metal, secured centrally to the fish-plate by a headed bolt or rivet passing through coincident holes in the two plates, and provided at each end with an upturned nut-locking-flange, and with two clips struck up from the body of the plate and severally adapted to enter the clip-receiving holes in the fish-plate, there being one clip on either side of the securing bolt or rivet, substantially as specified.

In testimony that I claim the foregoing I hereunto affix my signature this 12th day of September, A. D. 1892.

OREN H. BEAM. [L. S.]

In presence of—
JOHN S. KENNEDY,
I. A. CARLINE.